United States Patent [19]

Devaud et al.

[11] Patent Number: 5,539,639
[45] Date of Patent: Jul. 23, 1996

[54] DEVICE FOR DYNAMICALLY CONTROLLING THE TRIM OF A VEHICLE

[75] Inventors: Gérard Devaud, Paris; Christian Valent, Velizy, both of France

[73] Assignee: S.A.M.M. Societe D' Applications Des Machines Motrices, Bievres, France

[21] Appl. No.: 264,355

[22] Filed: Jun. 22, 1994

[30] Foreign Application Priority Data

Jun. 23, 1993 [FR] France ................................ 93 07645

[51] Int. Cl.[6] .............................................. B60G 17/015
[52] U.S. Cl. ...................................... 364/424.05; 280/707
[58] Field of Search ................................ 364/130, 424.5; 280/707, 840, 6.12, 714

[56] References Cited

U.S. PATENT DOCUMENTS

| | | | |
|---|---|---|---|
| 4,975,849 | 12/1990 | Ema | 364/424.05 |
| 5,110,152 | 5/1992 | Jones | 280/707 |
| 5,301,111 | 4/1994 | Utsui et al. | 364/424.5 |
| 5,322,319 | 6/1994 | Tanaka et al. | 280/707 |

FOREIGN PATENT DOCUMENTS

| | | |
|---|---|---|
| 0235695 | 9/1987 | European Pat. Off. . |
| 3817540 | 11/1989 | Germany . |
| 2255056 | 10/1992 | United Kingdom . |

OTHER PUBLICATIONS

Abstract of JP61081212, Patent Abstracts of Japan, vol. 10, No. 253, Apr. 24, 1986.
Abstract of JP631733710, Patent Abstracts of Japan, vol. 12, No. 442, Jul. 18, 1988.
Abstract of JP3178822, Patent Abstracts of Japan, vol. 15, No. 427, Aug. 2, 1991.
Abstract of JP61081213, Patent Abstracts of Japan, vol. 10, No. 253, Apr. 24, 1986.
Abstract of JP62289424, Patent Abstracts of Japan, vol. 12, No. 179, Dec. 16, 1987.
Abstract of JP2270619, Patent Abstracts of Japan, vol. 15, No. 28, Nov. 5, 1990.
Abstract of JP2306812, Patent Abstracts of Japan, vol. 15, No. 89, Dec. 20, 1990.

*Primary Examiner*—Roy N. Envall, Jr.
*Assistant Examiner*—Steven R. Garland
*Attorney, Agent, or Firm*—Sughrue, Mion, Zinn, Macpeak & Seas

[57] ABSTRACT

This device is intended for a vehicle in which the wheels (1) are each equipped with a damper (2) and with a suspension spring (3); it comprises, for each wheel, an actuator (4) interacting with the spring, and provided with a position sensor (5), an electro-hydraulic interface (6) for controlling the actuator, this interface being connected to the actuator, to a hydraulic unit (8) of the vehicle and to a source of electrical energy, and a computer (7) for trim management, connected to the interfaces, and programed to take account of each parameter of the driving of the vehicle, especially its speed and the angle of its steering wheel; on the basis of these parameters, the computer controls the interfaces (6) and the actuators within the context of loops for slaving the latter to reference output travels, corresponding to maintaining the vehicle in predetermined trim stored in the memory of the computer. This trim system makes it possible to prevent rolling and pitching during the phases of acceleration, braking and cornering, without affecting the comfort of the occupants.

6 Claims, 3 Drawing Sheets

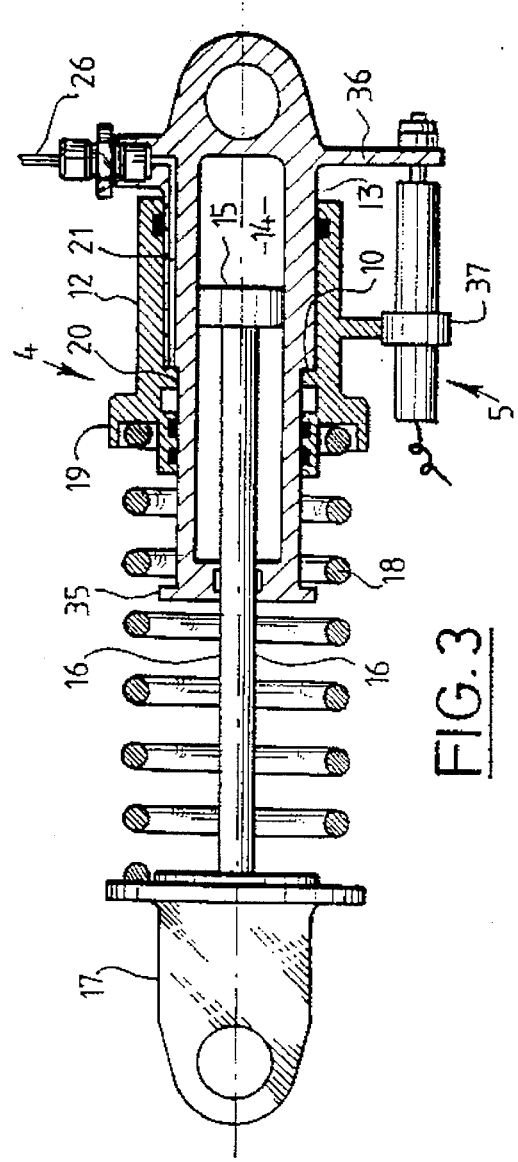
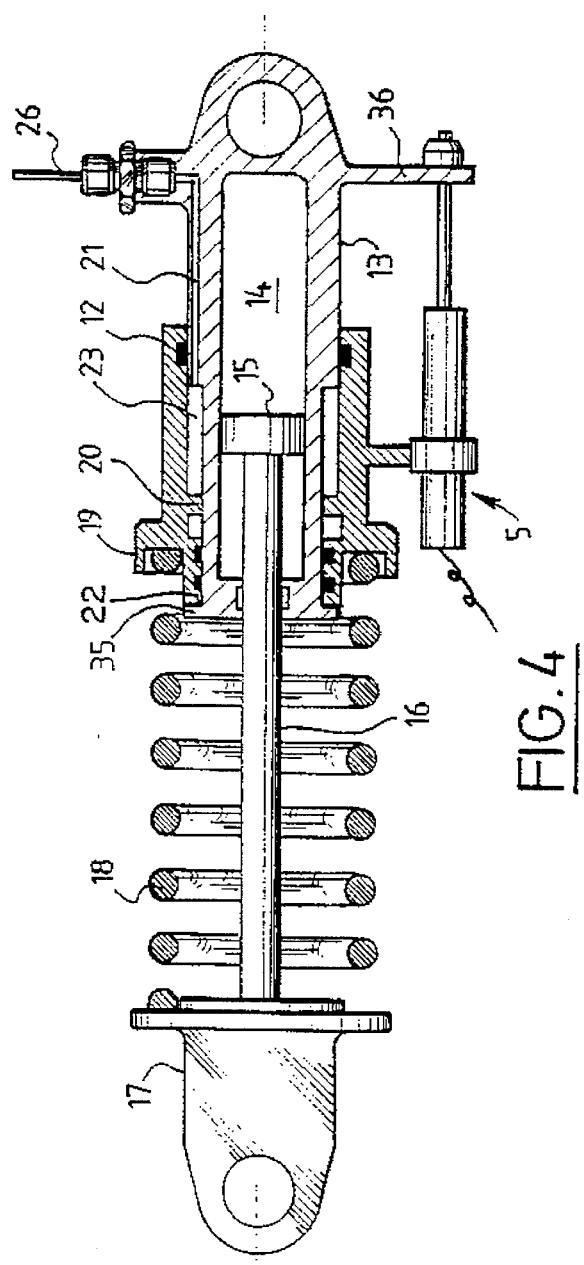

DEVICE FOR DYNAMICALLY CONTROLLING THE TRIM OF A VEHICLE

BACKGROUND OF THE INVENTION

The subject of the present invention is a device for controlling the trim of a vehicle with four wheels, each equipped with a damper and with a suspension spring.

It is known that the operation and characteristics of the vehicle suspension are governed by three key parameters: the trim, the stiffness, provided in mechanical systems by a spring, and the damping, provided by a hydraulic damper or a friction device.

In order to stop the vehicle from rolling, especially during cornering, most vehicles are currently equipped with anti-roll bars of fixed stiffness, with one bar per axle, this bar being connected to the springs of the suspension. However, in some cases, these bars encounter siting difficulties, and their overall size may be a problem. What is more, as soon as the loads are not strictly symmetrical on the two wheels of one axle, the stiffness of the anti-roll bar stiffens the suspension, which constitutes another significant drawback of this type of embodiment.

More recently, three types of suspension have been proposed, aiming in general to improve the road holding of the vehicle and the comfort of the occupants. Thus, a first type of so-called "active" suspension is contrived so that it anticipates the dynamics of the connection of the vehicle with the ground with regard to the essentially random layout of the road, incorporating the parameters relating to speed, turn radius, load, acceleration/deceleration, ride height. For this purpose the suspension includes a servo valve associated with a hydraulic actuator and driven by a control solenoid valve. However, this suspension does not have a spring and therefore does not fulfill the stiffening function. What is more, it exhibits the drawback of requiring very significant amounts of hydraulic and electrical energy in order to fulfill the stiffening function despite the absence of the spring, so as to allow the stored-up energy to be restored. In effect, the electrical energy required may be of the order of 20 to 30 Kw.

The object of the so-called "semi-active" suspension, while retaining the existing elements and especially the dampers, is to vary the reference point at which the suspension elements bear, by incorporating all or some of the aforementioned parameters. For competition vehicles, the prime objective is therefore to maintain the ground effect as far as possible. In this "semi-active" suspension, the actuator is coupled to a hydropneumatic damper, which fulfills the stiffening function by the compression of the gas. The damping function may be fulfilled by a restriction between the actuator and the hydropneumatic cylinder, and allows the ground clearance to be corrected.

This device, used in some top-of-the-range touring vehicles, makes it possible to manage the rolling and pitching in ways other than with bars of fixed stiffness. Depending on the required dynamics, it is then possible to assume that the energy required is brought down to approximately ⅕ to ⅒ of the energy necessary for an active suspension.

Nevertheless, a "semi-active" suspension does not allow dynamic correction of the trim, because it is only possible to adjust it for two or three predetermined ground clearance values. Furthermore, its time constants are high.

Finally, a third type of embodiment recently mounted on top-of-the-range touring vehicles, is so-called "variable" suspension, which includes dampers with a programed damping law, instead of the conventional dampers. Such a device is passive, in contrast to the two aforementioned types of suspension, because the only external energy required is that which causes the orifice plates of the damper to vary, upon a command from a suitably programed computer (it being possible for this suspension to be associated with anti-roll bars).

However, the variable suspension does not incorporate the stiffness function, because the computer only drives the damping, that is to say the flow rate of fluid through a restriction. Thus, this suspension too does not make it possible to perform dynamic management of the trim of the vehicle, that is to say in fact to monitor the position of the whole of the vehicle with respect to the ground (ride height for each axle, angle of roll, pitch, ...) in each of the various situations which follow on from each other during a road journey.

SUMMARY OF THE INVENTION

The object of the invention is to produce a device for dynamically controlling the trim of the vehicle during driving, therefore especially for controlling its roll and pitch, in order to overcome the shortfalls of the suspensions mentioned hereinabove, thus enhancing the comfort of the occupants of the vehicle and its road holding ability.

In accordance with the invention, the device for controlling trim comprises, for each wheel, an actuator interacting with the suspension spring, and provided with a position sensor, an electro-hydraulic interface for controlling the actuator, this interface being connected on the one hand to the actuator and on the other hand to a hydraulic unit of the vehicle and to a source of electrical energy, and a computer for dynamic trim management, connected to the interfaces, and programmed to take account of each parameter of the driving of the vehicle, especially its speed and the angle of its steering wheel, and, on the basis of these parameters, to control the electro-hydraulic interfaces and hence the actuators within the context of loops for slaving the latter to reference output travels, corresponding to maintaining the vehicle in predetermined trim for various situations, stored in the memory of the computer.

Electro-hydraulic interfaces may, for example, be either solenoid valves, or servo valves.

Advantageously, these interfaces are driven by an "all or nothing" signal of determined period, pulse-width modulated and supplied by the computer.

Specially designed software allows this computer to store in memory reference values for the positions of the various actuators of each axle, therefore especially for the height of the body of the vehicle above the ground. In addition, the computer is connected to a line for taking account of each parameter of the car during driving, especially acceleration, deceleration, speed, angle of the steering wheel, (i.e., parameters depending directly upon the driver). On the basis of all this data, the trim management software determines the orders which are appropriate for the electro-hydraulic interfaces and therefore for the actuators, in order to prevent any parasitic and undesirable movement of the vehicle with respect to the various reference values provided for the various types of situation envisaged (bends, maximum straight-line speed, . . . ).

Other particular features and advantages of the invention will emerge during the description which will follow, given with reference to the appended drawing which illustrates one embodiment thereof by way of non-limiting example.

BRIEF DESCRIPTION OF THE DRAWING

FIG. 3 is a view, half in longitudinal section and half in elevation, of one of the suspension elements of FIG. 2 in the low position.

FIG. 4 is a view similar to FIG. 2 showing the suspension element in the high position.

DESCRIPTION OF THE PREFERRED EMBODIMENT

Figure 1:
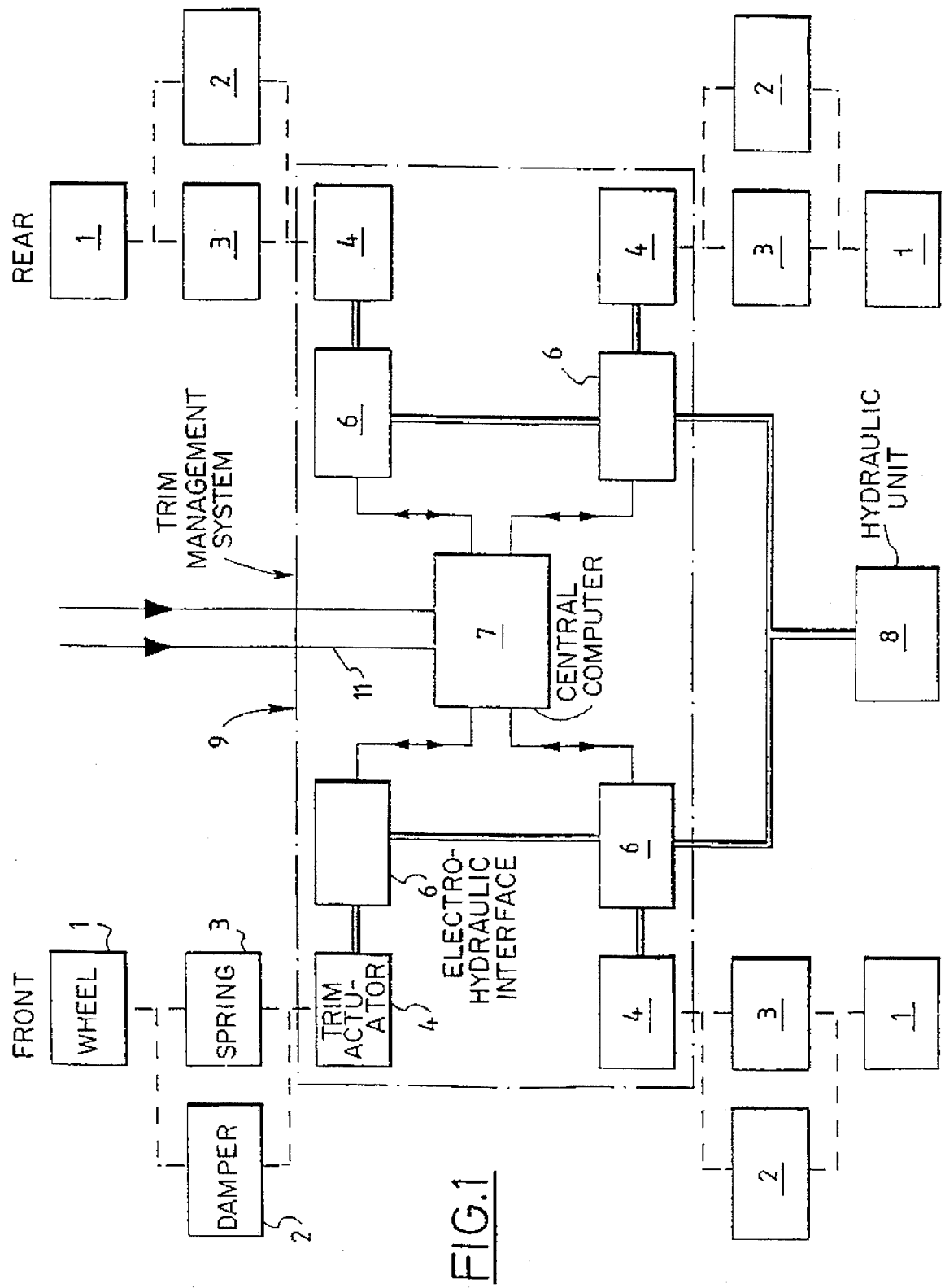
FIG. 1 is an overall block diagram of the device for controlling the trim of a vehicle according to the invention.

The block diagram of FIG. 1 illustrates a device for controlling the trim of a vehicle with four wheels 1, each equipped with a damper 2 and with a suspension spring 3.

Figure 2:
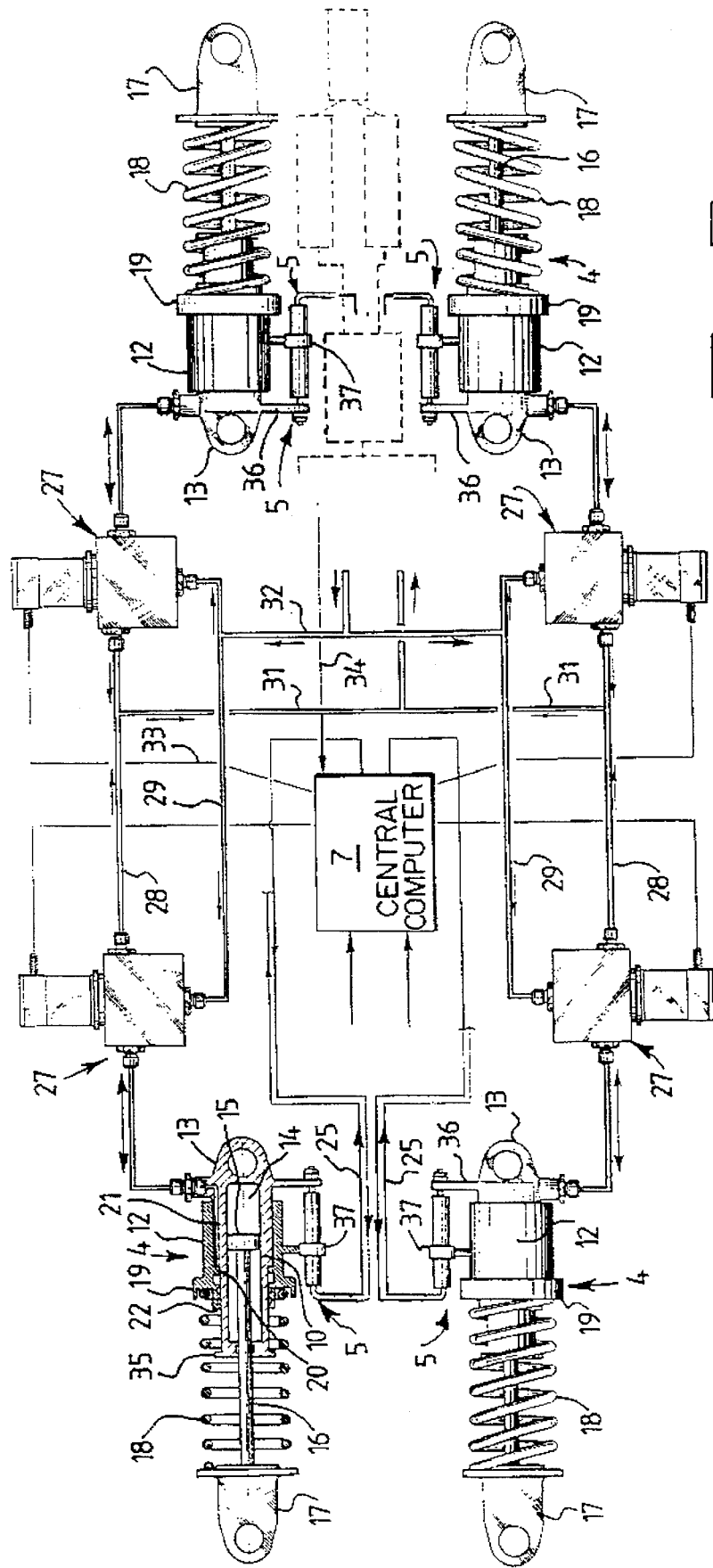
FIG. 2 is a diagrammatic view of a concrete embodiment of the trim control device according to the invention, especially showing the four actuators, the four associated control interfaces, and the computer managing the whole assembly.
Figure 5:
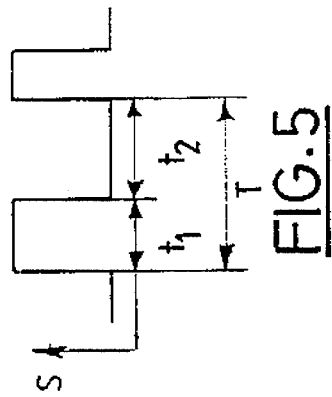
FIG. 5 is a graph representing the signal for controlling the electro-hydraulic interfaces.

With each wheel 1 there is associated a trim actuator 4 interacting with the spring 3 and provided with a position sensor 5 (represented in FIG. 2). To each actuator 4 there is connected an electro-hydraulic interface 6 for controlling the corresponding actuator, this interfate 6 itself being connected by a control connection to a central computer 7 for dynamic management of the trim of the vehicle. The four control interfaces 6 are connected together in pairs as well as to a hydraulic unit 8 of the vehicle.

This electro-hydraulic actuating system makes it possible to act between the bearing reference of the stiffened function of the suspension, provided by the spring 3, and the anchorage to the body, the damping function, fulfilled by the damper 2 (passive element) being in parallel. In order for this function to satisfy the desired criteria, it must be slaved in terms of position between the reference alone and the position of the body of the vehicle.

The most advantageous layout for achieving this result consists in using, for each wheel 1, a linear actuator 4 slaved in terms of position via the computer 7 which incorporates all the parameters for the dynamics of the vehicle, so as to prevent rolling and pitching in the phases of acceleration, braking and cornering.

The source of hydraulic energy constituted by the unit 8 is outside the trim management system 9 proper, surrounded by a chain line in FIG. 1. It may be either created especially, or taken from the existing installation of the vehicle and intended for other functions. The energy required is a function of the amplitude which is to be corrected and of the inherent dynamics of the vehicle. Of course the trim control device diagrammatically represented in FIG. 1 dispenses with anti-roll bars. The driver may, depending on the load, the shape of the path and the sensitivity which he desires, introduce a weighting of this function at the dashboard, connected by a control line 11 to the computer 7 in order to allow the latter to receive orders from the driver. Moreover, the computer 7 is of course programmed with suitable trim-management software, which makes it possible to take account of each parameter of the driving of the vehicle, especially its speed and the angle of its steering wheel, and, on the basis of these parameters, to control the electro-hydraulic interfaces 6 and hence the actuators 4 within the context of loops for slaving the latter to reference output travels. These travels correspond to maintaining the vehicle in predetermined trim corresponding to various situations stored in the memory of the computer 7.

A concrete embodiment of the trim-dynamics control device according to the invention will now be described with reference to FIGS. 2 to 5.

Each trim actuator 4 includes a sleeve 12 slidably mounted around a hydraulic cylinder 13 including a closed internal chamber 14 filled with gas and in which a piston 15 secured to an axial rod 16 can slide. The latter is mechanically secured to a yoke 17 connected to the body (not represented) of the vehicle, and a coil suspension spring 18, coaxial with the rod 16 and with the cylinder 13, is interposed between the yoke 17 and the U-shaped end 19 of the sleeve 12. The latter bears slidably on the external wall of the cylinder 13 via internal collars 20, 22 and, on the other side of these, bears slidably on the external wall of a duct 21 for supplying with hydraulic fluid the annular space 23 delimited by the internal collar 20 and a shoulder 10 of the wall of the cylinder, in which the duct 21 is formed.

The sleeve 12 is provided with a position sensor 5, powered by an electrical connection 25 connected to the battery of the vehicle. The sensor 5 is supported by a lug 36 of the cylinder 13 and passes slidingly through a yoke 37 secured to the sleeve 12. The duct 21 is connected by a pipe 26 to an interface which, is constituted by a solenoid valve 27 of a type which is, in itself, known and which does not require any description. The solenoid valves 27 are connected together in pairs by hydraulic fluid pipes 28, 29, the pipes 28 joining up in order to form a single pipe 31 for return to tank, while the pipes 29 join up in order to form a single pipe 32 for supplying hydraulic liquid under pressure.

The four solenoid valves 27 are also connected by electrical connections 33 to the computer 7, itself powered by the battery via a connection 34.

The sleeve 12 and the cylinder 13 form the trim actuator 4, and the gas chamber 14 as well as the piston 15 which slides therein constitute the damper.

Each trim actuator 4 can assume two extreme positions, represented in FIGS. 3 and 4. In the first, position the extreme bottom position, illustrated in FIG. 3, the internal collar 20 comes into abutment against the shoulder 10 and closes off the inlet of the duct 21, the yoke 17 and the body of the vehicle therefore being in a bottom position (the actuators 4 have been represented horizontally for convenience of the drawing). In order to place the actuator 4 and the body in the extreme top position, the sending of pressurized fluid into the duct 21 via the associated solenoid valve 27 is commanded. The hydraulic pressure exerted on the collar 20 moves the sleeve 12 away from the shoulder 10 and frees the annular chamber 23, which fills with fluid while the sleeve 12 continues its travel until its terminal collar 22 comes into abutment against a projecting flange 35 at the end of the cylinder 13. During the travel of the sleeve 12, the spring 18 is firstly compressed and raises the yoke 17 and the body of the vehicle. The travel of the sleeve 12 is damped by the piston 15 sliding in the pneumatic chamber 14, and which moves integrally with the yoke 17. Finally, during its travel, the sleeve 12 entrains the yoke 37 which glides along the sensor 5.

As already indicated, the trim management software of the computer 7 takes account of each parameter of the car: acceleration, braking, ground clearance of each wheel 1, speed, angle of the steering wheel during the journey . . . ). Each position sensor 5 continuously supplies the position of the corresponding actuator 4, and therefore of the wheel 1 with respect to the body of the vehicle. This information is entered into the computer 7 at the same time as the other aforementioned information, then the angle of the wheel etc. and the orders from the driver. In particular, knowledge of the angle of the steering wheel and of the speed gives the software advance notice of what is about to happen, in a time lapse of the order of 100 milliseconds between the rotation of the steering wheel and that of the wheels 1. The computer 7 therefore puts this time to good use in order to give correction orders to the solenoid valves 27 and hence to the actuators 4, by modulating the flow rate of fluid into the ducts 21 (injection or removal of the fluid), this being so as to slave the position of each actuator 4, and therefore the trim, the rolling and the pitching of the body of the vehicle, to the reference values stored in the memory of the computer 7.

Thus, by virtue of the invention, a system is produced for dynamically managing the rolling, pitching and therefore the trim of the vehicle, without affecting the comfort in terms of stiffness, suspension and damping.

Each solenoid valve 27 is driven by a pulse-width modulated signal S (FIG. 5) having two different widths t1 and t2. This signal supplies the associated actuators 4 with an "ingoing" flow rate q1 during the time t1 when use is connected to the high pressure fluid pipe 32, and an "outgoing" flow rate q2 during the time t2 (t1+t2=T), when use is connected to the low pressure fluid pipe 31.

For a constant reference value xe, the output travel xs of the actuator 4 is constant, and the operation is governed by the following relationship: during an operating period T $$\Delta xs = q1\ t1 - q2\ t2$$

The flow rate q1 is a function, on the one hand, of the passage cross-section $\theta$ of the fluid, and, on the other hand, of the square root of the difference between the high pressure P1 and the pressure generated by the antagonistic force PA $$q1 = K\theta \sqrt{P1 - PA}$$

The flow rate q2 is a function, on the one hand, of the passage cross-section $\theta$ of the fluid, and, on the other hand, of the square root of the difference between the pressure generated by the antagonistic force PA and the low pressure P0

$$q2 = K\theta \sqrt{Pa - P0}$$

These relationships generate, within automatic-control loops, positions for each of the wheels which are functions of the values t1, t2 (t2=T−t1).

The driving of the solenoid valves 27 in "all or nothing" mode, causing the times during which oil is admitted and expelled to vary, offers significant advantages: on the one hand, simplicity and, on the other hand, in the event of a breakdown in the electrical power supply, the de-energized solenoid valves 27 all become immobilized in the same position. This results in the vehicle regaining a determined trim, whereas with proportionally controlled solenoid valves, the trim is differential, because it varies from one actuator to another.

These solenoid valves 27 therefore constitute bistable interfaces, advantageously used in place of proportional hydraulic interfaces.

The solenoid valves 27 may be replaced by servo valves, which are, however, more expensive. In general, the electro-hydraulic control interfaces may, depending on the type of vehicle, be grouped together into a single module. According to another possible variant embodiment, the mechanical suspension springs 18 may be replaced by hydropneumatic springs.

The description of the software corresponding to the system in accordance with the invention will be given hereafter, by way of a supplement. Drawing-up the source program of this software is within the grasp of the person skilled in the art within the context of his normal knowledge on the basis of this description and of the foregoing description.

INPUTS/OUTPUTS

Hardware Inputs/Outputs
   Sensor supplying information for calculating the speed of the vehicle
   4 LVDT (linear inductive sensors) measurement giving the height at each wheel, coded over 10 bits
   4 PWM (pulse-width modulation) controls—having a period of 20 ms—for driving the EVPs (driving solenoid valves) (1 per wheel)
Software Inputs/Outputs
   1 map for each wheel (4 in total) of body height on the same scale as the measurement from the associated LVDT, taking account of the min (LVDTmin) and max (LVDTmax) values supplied by the LVDT for the car in the top and bottom position. The map assuming the form:

| Speed  | V0 | V1 | V2 | V3 | V4 | V5 | V6 |
|--------|----|----|----|----|----|----|-----|
| Height | L0 | L1 | L2 | L3 | L4 | L5 | L6 |

Car speed (V) on the same scale as the speeds V0 to V6, this car speed is saturated at V6 if it is greater than V6.

Automatic-control gain (G), common to the 4 wheels.

Height of each wheel (4 in total) over 10 bits (H).

The cyclic ratio of the PWM for controlling each wheel (PWM) (4 in total).

CALCULATION ALGORITHM

The following description applies to one wheel, it is valid for all 4 wheels, each wheel having its own inputs/outputs. Only the vehicle speed and the automatic-control gain are common to all 4 wheels.

The value of the height of the body is sampled 4 times (every 5 ms) between each body height calculation (every 20 ms). A mean of these 4 values is taken, this mean is used to calculate the slaving in the variable H.
Calculation Pseudocode
   Vehicle speed (V) acquisition
   Body height (H) acquisition
   Search for the markers Vi and Vi+1 in the body height map such that:

$$Vi \leq V \leq Vi+1$$

Calculation of the body height reference value by linear interpolation:

$$Ref = (Li+1-Li)/(Vi+1-Vi) \times (V-Vi) + Li$$

Calculation of the discrepancy with gain (G):

Discrepancy=G×(Ref−H)

Calculation of the cyclic ratio of the PWM control (PWM):

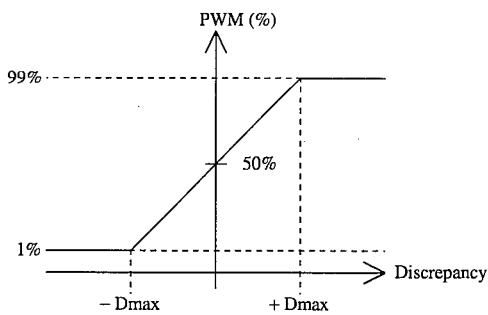

where Dmax=LVDTmax−LVDTmin.

The effective control of the PWM is a square signal for which the time spent in the high state is 1% of 20 ms for 1% of a cycle and 99% of 20 ms for 99% of a cycle.

We claim:

1. A device for controlling the trim of a vehicle with four wheels, each of which is equipped with a damper and a suspension spring, said vehicle having a hydraulic unit, said device comprising:

a computer for dynamic trim management, actuators, position sensors, and electrohydraulic interfaces, selected from the set consisting of solenoid valves and servo-valves;

each of said actuators, said position sensors, and said electrohydraulic interfaces cooperating with a respective one of said four wheels;

each of said position sensors providing position information about a respective one of said actuators to said computer;

each of said actuators interacting with said suspension spring of said respective one of said four wheels;

each of said actuators having said suspension spring of said respective one of said four wheels coaxially mounted thereon;

each of said actuators being (1) connected to a respective one of said electrohydraulic interfaces, and (2) controlled by said respective one of said electrohydraulic interfaces within a servo-control loop;

each of said electrohydraulic interfaces being connected to said hydraulic unit of said vehicle, to a source of electrical energy, and to said computer;

said computer being programmed to take into account driving parameters of said vehicle, and providing centralized trim control of all of said four wheels by causing each of said electrohydraulic interfaces to control said respective one of said actuators within said servo-control loop to reference selected output travels; and said output travels being determined to maintain said vehicle in predetermined trims for different situations, and being stored in a memory of said computer.

2. The device according to claim 1, wherein said driving parameters of said vehicle comprise:

the speed of said vehicle, the angle of a steering wheel of said vehicle, the ground clearance of each of said four wheels, the position of an accelerator pedal of said vehicle, and the position of a brake pedal of said vehicle.

3. The device according to claim 2, wherein said electrohydraulic interfaces are driven by an "all or nothing" signal (S) of determined period (T), which is pulse-width modulated and supplied by said computer.

4. The device according to claim 3, wherein:

each of said actuators is hydraulic and single-acting, and travel of each of said actuators is slaved to a position reference value.

5. The device according to claim 2, wherein said suspension spring of each of said four wheels of said vehicle is hydropneumatic.

6. A device for controlling the trim of a vehicle with four wheels, each of which is equipped with a damper and a suspension spring, said vehicle having a hydraulic unit, said device comprising:

a computer for dynamic trim management, actuators, position sensors, and electrohydraulic interfaces, each of which is selected from the set consisting of solenoid valves and servo-valves;

each of said actuators, said position sensors, and said electrohydraulic interfaces cooperating with a respective one of said four wheels;

each of said position sensors providing position information about a respective one of said actuators to said computer;

each of said actuators interacting with said suspension spring of said respective one of said four wheels;

each of said actuators having said suspension spring of said respective one of said four wheels coaxially mounted thereon;

each of said actuators being (1) connected to a respective one of said electrohydraulic interfaces, and (2) controlled by said respective one of said electrohydraulic interfaces within a servo-control loop;

each of said electrohydraulic interfaces being connected to said hydraulic unit of said vehicle, to a source of electrical energy, and to said computer;

said computer being programmed to take into account driving parameters of said vehicle, and providing centralized trim control of all of said four wheels by causing each of said electrohydraulic interfaces to control said respective one of said actuators within said servo-control loop to reference selected output travels;

said output travels being determined to maintain said vehicle in predetermined trims for different situations, and being stored in a memory of said computer;

said driving parameters of said vehicle comprising:

the speed of said vehicle, the angle of a steering wheel of said vehicle, the ground clearance of each of said four wheels, the position of an accelerator pedal of said vehicle, and the position of a brake pedal of said vehicle;

said electrohydraulic interfaces being driven by an "all or nothing" signal (S) of determined period (T), which is pulse-width modulated and supplied by said computer;

each of said actuators being hydraulic and single-acting; and travel of each of said actuators being slaved to a position reference value.

* * * * *